United States Patent [19]

Rodieck

[11] 3,951,163

[45] Apr. 20, 1976

[54] AUTOMATIC ANTI-SIPHON VALVE

[76] Inventor: Chester C. Rodieck, P.O. Box 1329, Porterville, Calif. 93257

[22] Filed: July 5, 1972

[21] Appl. No.: 269,145

[52] U.S. Cl. ................................. 137/122; 61/12
[51] Int. Cl.² ................. F16K 31/22; E02B 13/00
[58] Field of Search ...................... 61/12; 137/122

[56] References Cited
UNITED STATES PATENTS

| | | | |
|---|---|---|---|
| 2,560,104 | 7/1951 | Guyton | 137/122 |
| 2,684,077 | 7/1954 | Shaffer | 61/12 X |
| 2,896,904 | 7/1959 | Northup | 61/12 X |

*Primary Examiner*—Robert G. Nilson
*Attorney, Agent, or Firm*—Dominick Nardelli

[57] ABSTRACT

Each valve of the present invention is comprised of a hollow valve body, an inlet connectable to a source of pressurized water, a first outlet disposed at the top of the valve body for emptying into an irrigation basin, a second outlet for connection to the inlet of a second valve; a float activated valve gate loosely guided within the hollow valve body, which gate is capable of sealing and holding closed the first outlet against liquid flow as long as water pressure is being applied to its inlet. In the open position of said first outlet the gate is capable of blocking water flow to the second outlet to prevent water flow to said second valve.

6 Claims, 5 Drawing Figures

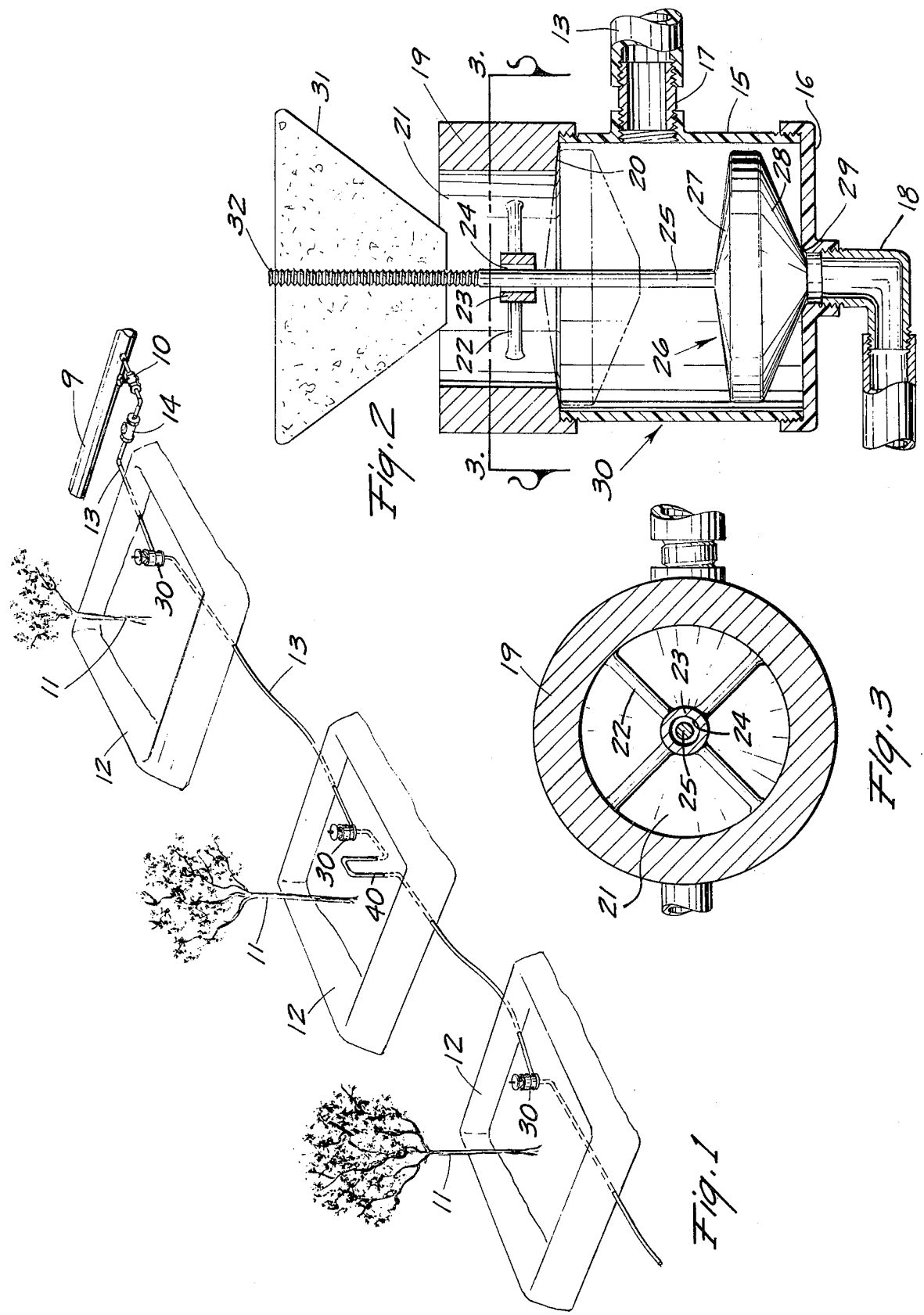

AUTOMATIC ANTI-SIPHON VALVE

BACKGROUND OF THE INVENTION

Irrigation systems in general tend to place large amounts of water in areas where they are not needed, thereby drowning plants which in turn causes rot. The same system may not provide enough water to other plants which are located, for example, near the top of a hill. On flat ground the water can be evenly distributed but an operator can leave the system on again causing the undesired flooding.

In U.S. Pat. No. 3,797,253 entitled "Automatic Irrigation System" by Chester C. Rodieck, the present inventor, there is disclosed an automatic system which utilizes a plurality of float activated valves, which valves are connected to a pressurizable water source. An irrigation basin is provided around each item to be watered, with one float activated valve positioned within each basin. One full flow riser of preselected height is connected to the exit side of each valve to maintain the float activated valve gate in the closed position once the valve is closed by the float action while allowing water to flow to the next valve thru the riser. When the line pressure is turned off the float activated valve gate falls to its open position ready for another watering cycle. The system disclosed in the referenced patent is extremely effective and fool proof on relatively level land, but, when there is a substantial height differential between adjacent valves, water siphons from the higher valves to the lower valves when the system is turned off. Excessive water is deposited in the basins serviced by the lower valves due to this siphoning action. It therefore would be highly desirable to have a system which would operate as efficiently on sloping ground as the referenced systme does on level ground. The present invention directs itself towards the solution of this siphoning problem.

SUMMARY OF THE INVENTION

The present invention is comprised of a hollow valve body with a cylindrical side and having a first outlet through its top end. An inlet is formed through the side of the valve body for receiving water under pressure. A second outlet is provided near the bottom of the valve body. A cylindrical valve gate positioned concentric within the hollow of the cylindrical valve body. An annular valve seat is fixedly attached at the top end to form said first outlet, and is adapted for receiving the top end of the valve gate so as to block water flow through the first outlet. A float is connected to the top end of the valve gate by a rod. The float is capable of urging the valve gate against the valve seat whenever the water level outside of the valve body is above or at a preselected level. A guide means affixed to the inner portion of the valve body for guiding the valve gate between two alternate positions: a first position against the said first outlet and a second position against said second outlet.

BRIEF DESCRIPTION OF THE DRAWINGS

FIG. 1 is a prospective view showing the valve of the present invention in place in an automatic irrigation system;

FIG. 2 is a sectioned view of one embodiment of the present invention;

FIG. 3 is a sectioned view of the embodiment shown in FIG. 2, taken along the section lines 3—3;

DESCRIPTION OF THE PREFERRED EMBODIMENTS

Figure 4:
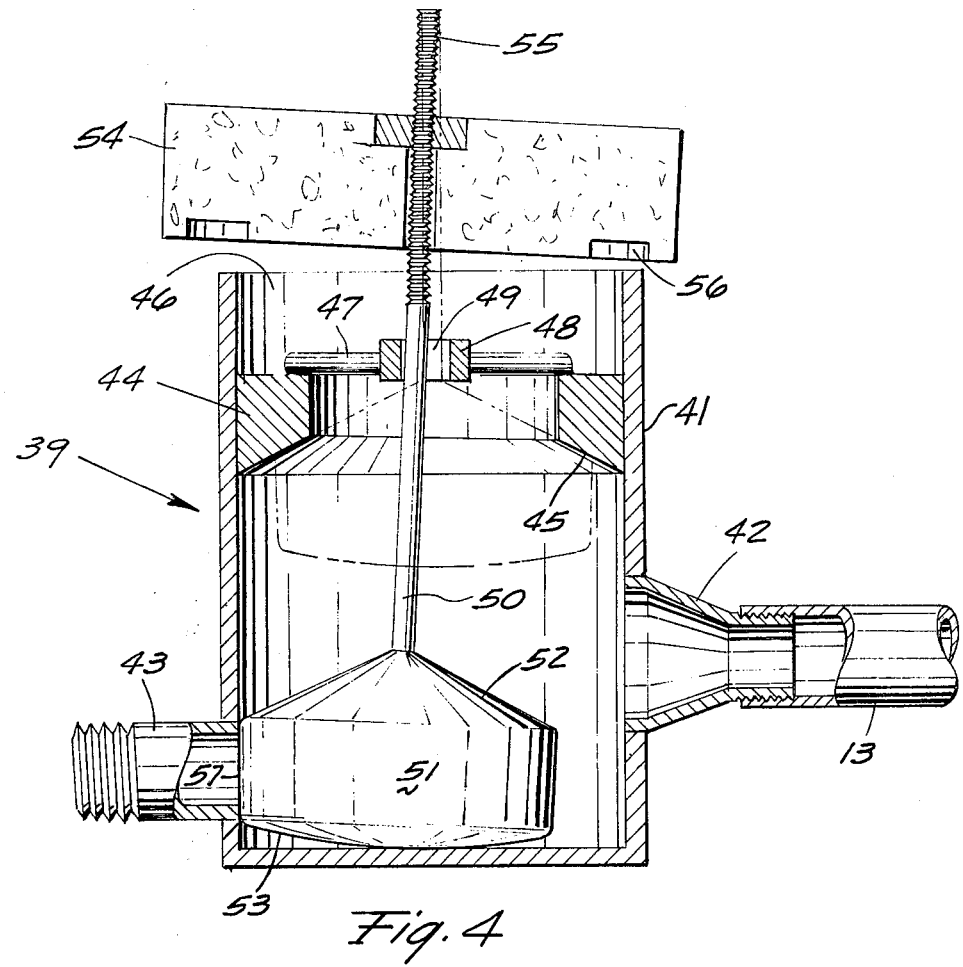
FIG. 4 is a sectioned view of a second embodiment of the present invention.

Referring to FIG. 1, a master valve 10 has its inlet side connected to a pressurized source of water 9. The outlet side of the master valve is connected to piping 13. Inserted at selected intervals in piping 13 are full flow risers 40. The piping 13 is routed near a plurality of trees 11, each of which is surrounded by an irrigation basin 12.

Located within each basin and connected to the piping 13 are a plurality of float operated anti-siphon valves 30. Although one valve is shown at each tree, it would be obvious to place either two or more valves within each basin and to include more than one tree in a basin. A high-low pressure valve 14 is inserted into the line after the master valve 10. The purpose of this valve is to close the line if the pressure should drop below a known value. Such a drop would be occasioned if one of the lines should rupture. The high pressure will close the valve, and hold it shut when all the float valves have been closed and the line pressure approaches the pressure of the source. If anti-siphon valves were not used the water left in the lines above the lower valves will siphon into the basins serviced by the lower valves when the system is shut down, placing more water in the lower basins then in the higher ones. For maximum plant growth each basin has to receive a known fixed amount of water, the siphoning action would upset the application of this fixed amount if it were not eliminated. The general operation of the system of FIG. 1 is set forth in more detail in U.S. Pat. No. 3,797,253, entitled "Automatic Irrigation System" by the present inventor. The main distinction between the system of the cited application and the present application is the novel anti-siphon valve of the present invention which prevents the irrigation water from siphoning to the lower valves.

Referring to FIGS. 2 and 3, the valve 30 has a hollow cylindrical housing 15 onto one end of which is attached a closing cap 16. A inlet pipe 17 connects the piping 13 thru the side wall of housing 15. An outlet pipe 18 continues the serial fluid path from piping 13 out thru the bottom of cap 16. On the opposite end of housing 15 is a cylindrical member 19 which forms a valve gate seat 20 projecting inward from the inner walls of housing 15. An opening 21 thru the center of cylindrical member 19 allows water from inlet 17 to flow out into the irrigation basin 12. Support ribs 22 project inward from member 19 to support a cylindrical bearing 23. Bearing 23 acts as a guide for rod 25 which projects thru an opening 24 in the bearing. The diameter of opening 24 is made sufficiently large as compared to the diameter of rod 25, so as to allow the rod to move from side to side. A valve gate 26 fits losely within housing 15 and is connected by means of rod 25 to a float 31. Screw threads 32 on rod 25 allow the float to be adjusted in height to control the level of water in the basins 12. The float 31 can take various shapes but the shape shown has been found to be the most desirable. The valve gate 26 has a first seating surface 27 that mates against the surface 20.

A second truncitated cone surface 28 which has an angle of approximately 45°, serves two purposes, one is to seal against surface 29 thereby closing the outlet 18; the other is to provide a surface against which the flow of water from inlet 17 can push when the gate is seated against surface 20, so that the water pressure can be used to hold the seating surface 27 of the gate into firm contact with seat 20.

In operation when the main valve 10 of FIG. 1 is turned on the first valve 30 receives water thru inlet 17. Since gate 26 shuts off flow through outlet pipe 18, the water rises in housing 15 and flows out thru opening 21 into the basin 12. When the water level in basin 12 rises high enough float 31 is activated pulling gate 26 against seat 20. As the rod 25 moves upward the flow of water causes the gate 26 to vibrate about an axis perpendicular to the main axis of rod 25. This vibration clears any particles of dirt that may have accumulated on the surface 27. This self-flushing action keeps the valve in perfect operating order despite the fact that dirt, sand and other debris may be contaminating the water supply. Once the gate 26 seals the opening 21 water commences to flow out outlet 18 to the inlet of the next lower valve. In the meantime the water originally placed in the first basin is being absorbed into the ground therefore the water level is dropping. The float 31 no longer has a force acting on it to keep it up and the gate 26 wants to move downward. The rush of water coming in thru inlet 17 flowing against surface 28 provides an upward acting force against the gate to keep it in place.

In some applications the force of water alone against the gate may not keep it in place. In those limited cases the full flow riser 40 shown in FIG. 1 is inserted into the line to provide an additional pressure on valve gate 26. This additional pressure is caused by the additional weight of the liquid in the riser. By adjusting the height of the riser the gate can be maintained in its closed position as long as water flows thru the riser. When the last valve in the line fed by master valve 10 is closed by the float action, the pressure in line 13 approaches the pressure in source 9. The high pressure shut off 14 is set to cut the flow of liquid off just before that pressure is reached. When this occurs all the valve gates 26 drop due to their weight, sealing their respective outlets 29, thereby preventing water from siphoning into the lower valves.

Referring to FIG. 4, wherein there is disclosed a second embodiment 39 of an anti-siphon valve which can be substituted for the valve 30. Valve 39 contains a hollow cylindrical housing 41 closed at one end. An inlet 42 projects thru the side wall of housing 41. An outlet 43 projects thru the side wall of housing 41 opposite and below the inlet 42. An inward projecting circular rim 44 has a seating surface 45 formed thereon. The other end of housing 41 defines an opening 46. Supports 47 project inward from the walls of housing 41 to a cylindrical bearing 48, having an opening 49 defined therethru. A rod 50 is losely guided by bearing 48. One end of rod 50 is connected to a float 54 with the other end of rod 50 connected to valve gate 51. Threads 55 are placed on one end of rod 50 to allow for an adjustment of the height of float 54 in the irrigation basin. A cylindrical groove 56 is formed on the under surface of float 54 to allow water to flow out of opening 46 unobstructed. Gate 51 has a slanted cone surface 52 which mates against surface 45 to form a water-tight seal. The bottom surface 53 of the valve gate 51 is slightly curved. The sides 57 of gate 51 is tapered toward the center of the gate as it moves towards the bottom so that a seal can be effected against the outlet 43 when the gate 51 is displaced from center.

Whenever water flows into the valve 39 from the inlet 42, the water will tend to flow out of the first outlet 43 since it is lower than outlet 46. The flowing water causes the gate to move towards outlet 43, thereby closing it and the water then flows out of outlet 46. When the water in the particular basin 12 reaches a predetermined height, the float lifts the gate 51. The width of surface 57 is made slightly less than the opening of inlet 42 so that the valve gate in its upward travel does not substantially block the inlet water flow. When gate 51 is seated against surface 45 the water flow from inlet 42 acting on the curved bottom 53 of gate 51 holds the valve gate closed tightly against surface 45. When the line pressure is turned off the gate 51 falls to the bottom of housing 41. Water attempting to siphon thru outlet 43 causes the valve gate to be pulled off center causing surface 57 to seal the outlet 43. The opening 49 in bearing 48 has to be large enough to allow the rod 50 to cant at an angle that will allow the gate to seal. The looseness of bearing 48 also allows the gate to vibrate and self-flush as it moves to the closed position.

Figure 5:
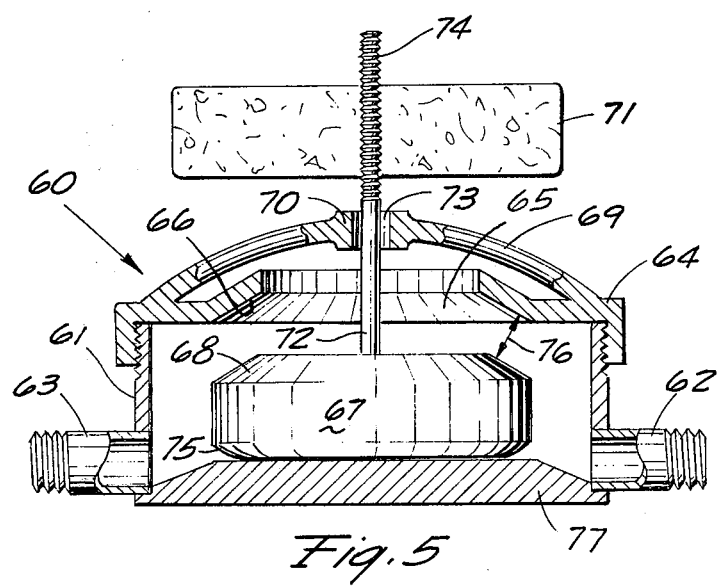
FIG. 5 is a sectioned view of a third embodiment of the present invention.

Referring now to FIG. 5, wherein there is shown a third embodiment of an anti-siphon valve 60 which can be substituted for the valve 30. The valve 60 has a hollow cylindrical housing 61. An inlet 62 passes thru the side wall of housing 61 near the bottom of the housing. An outlet 63 is positioned opposite the inlet thru the side wall of housing 61. An end cap 64 fits over the open end of housing 61. The end cap has an opening 65 and a seating surface 66. A valve gate 67 has a seating surface 68 formed to seal against seating surface 66. The bottom 77 of housing 61 is raised to increase the height that the water from inlet 62 must travel to reach the outlet 63 when the gate 67 is resting on the raised bottom 77. Bearing 70 is supported above the end cap 64 by means of four supports 69. Shaft 72 connects the valve gate 67 to the float 71. Threads 74 on rod 72 allow the float to be adjusted in height. The opening 73 in bearing 70 is sufficient in size to allow the rod 72 some side play. Valve 60 is designed specifically to be used with the riser 40, shown in FIG. 1. Water under pressure comes in thru inlet 62 and due to the riser 40 flows out thru the opening 65. Water will not flow past riser 40 due to its height being above the opening 65. When the level of water in the basin rises sufficiently, float 71 will cause gate 67 to seat against seat 66. The turbulence caused by the raised bottom 77 acting on the slanted surface 75 of valve gate 67 will hold the valve gate in the closed position even though the level in the basin drops below the float 71. When the line pressure is turned off the valve gate 67 drops to the bottom 77.

Although there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

I claim:

1. A float activated irrigation valve with anti-siphon action for use in an irrigation basin with a pressurized source of water comprising, in combination:

a hollow valve housing having a side wall, one open end and one closed end;

an inlet connected through the side wall of said valve housing for connection to a source of pressurized water;

an outlet connected through said hollow valve housing at or near the closed end;

a valve gate freely fitting within the hollow of said valve housing, said valve gate having on one surface thereof a first valve seat and, on a second surface thereof, a second valve seat;

a third valve seat fixedly connected to said hollow valve housing at said open end, for mating with the first valve seat of said valve gate when said gate is in the closed position, to effectively close said open end to water flow;

a fourth valve seat formed integrally with said outlet for mating with the second valve seat of said valve gate when the pressurized source of water is turned off to effectively close said outlet, thereby preventing a siphoning action;

a float positioned outside the open end of said valve housing;

a rod connecting said valve gate to said float;

means for loosely guiding said rod for movement within said housing;

said outlet and said integral fourth valve seat being connected through the side wall of said valve housing at the closed end, said second valve seat being formed continuously around the outer periphery of said valve gate, and said valve gate moving sideways in said housing to effect a seal with said outlet.

2. The valve according to claim 1 wherein the diameter of said inlet is greater than the width of said second valve seat such that said valve gate in its travel between the open and closed position cannot substantially close off said inlet.

3. A float activated valve for use, in combination, with a plant irrigation basin and a pressurized source of water, said valve comprising:

a valve housing adapted to be disposed vertically within said basin and having a tubular side and a cover on the lower end;

an inlet connected through said tubular side for connection to said pressurized source;

a first outlet formed in said housing;

a valve gate freely fitted within said housing and having, on one surface thereof, a first valve seat and, on a second surface thereof, a second valve seat;

an annular valve seat fixedly connected to said housing at the top end to form a second outlet and having an annular surface for mating with said first valve seat;

said first outlet having another annular surface for mating with said second valve seat;

a rod fixed to said valve gate and extending upward through said annular valve seat; and a float mounted on said rod above said annular valve seat outside of said housing.

4. The valve of claim 3 wherein said first outlet is limited as being formed also through said tubular side and opposite said inlet.

5. The valve of claim 4 wherein said valve gate has a rounded lower surface so that when the rounded surface contacts said cover, said first outlet and said second surface are substantially at the same height.

6. The valve of claim 3 wherein said first outlet is limited as being formed through said cover.

* * * * *